(12) United States Patent
Spang

(10) Patent No.: US 6,334,809 B1
(45) Date of Patent: Jan. 1, 2002

(54) METHOD AND SYSTEM FOR SHARPENING TEETH ON SAW CHAINS

(76) Inventor: Kåre Spang, Hesbjergvej 11, DK-5491 Blommenslyst (DK)

( * ) Notice: Subject to any disclaimer, the term of this patent is extended or adjusted under 35 U.S.C. 154(b) by 0 days.

(21) Appl. No.: 09/423,668

(22) PCT Filed: May 20, 1998

(86) PCT No.: PCT/DK98/00205

§ 371 Date: Nov. 22, 1999

§ 102(e) Date: Nov. 22, 1999

(87) PCT Pub. No.: WO98/52712

PCT Pub. Date: Nov. 26, 1998

(30) Foreign Application Priority Data

May 21, 1997 (DK) ................................................ 0580/97

(51) Int. Cl.[7] .................................................. B24B 11/00
(52) U.S. Cl. .................................. 451/45; 76/36; 83/832
(58) Field of Search .......................... 451/45, 124, 127, 451/185, 192, 213; 76/25 A, 36, 37, 74; 83/832

(56) References Cited

U.S. PATENT DOCUMENTS

| | | | | | |
|---|---|---|---|---|---|
| 4,040,314 | A | * | 8/1977 | Geeck | 76/78 R |
| D257,527 | S | * | 11/1980 | Aksamit | D8/71 |
| 4,440,045 | A | * | 4/1984 | Aksamit | 76/25 A |
| 4,727,776 | A | * | 3/1988 | Granberg | 76/25 A |
| 4,843,718 | A | * | 7/1989 | Nagashima | 30/138 |
| 6,005,938 | A | | 12/1999 | Banker et al. | 380/20 |

* cited by examiner

*Primary Examiner*—Joseph J. Hail, III
*Assistant Examiner*—Daniel Shanley
(74) *Attorney, Agent, or Firm*—Nixon Peabody LLP; David S. Safran

(57) ABSTRACT

For users of chain saws it is known that the chain saw teeth should rather often be sharpened by filing in order to keep them well cutting. Traditionally, such a sharpening is effected by means of a straight filing rod moved in a reciprocal manner, but according to the invention it is realized that it is better to arrange the rod as a rotary circular or screw shaped formation, whereby the teeth can be worked in a simplified manner.

11 Claims, 2 Drawing Sheets

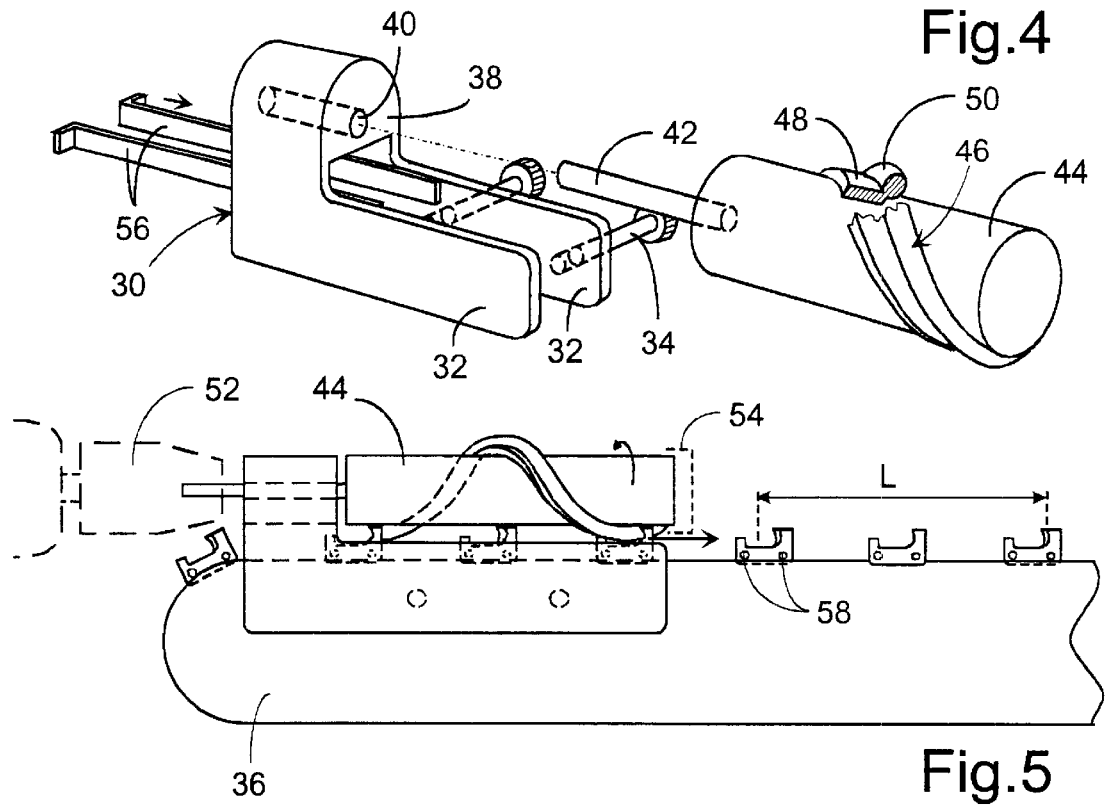
Fig.4
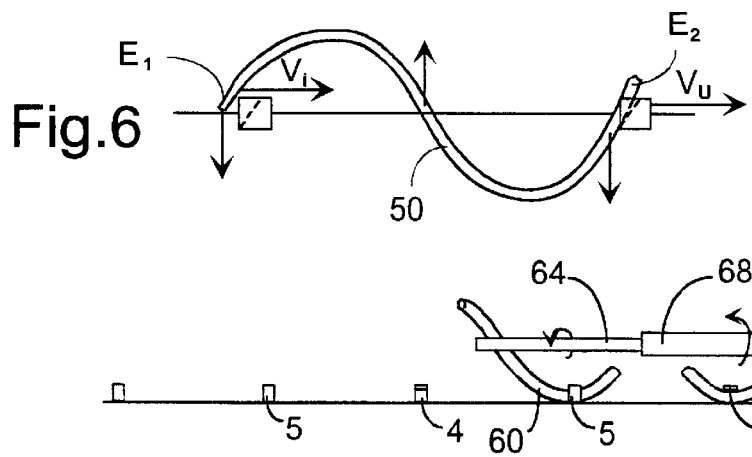
Fig.5
Fig.6
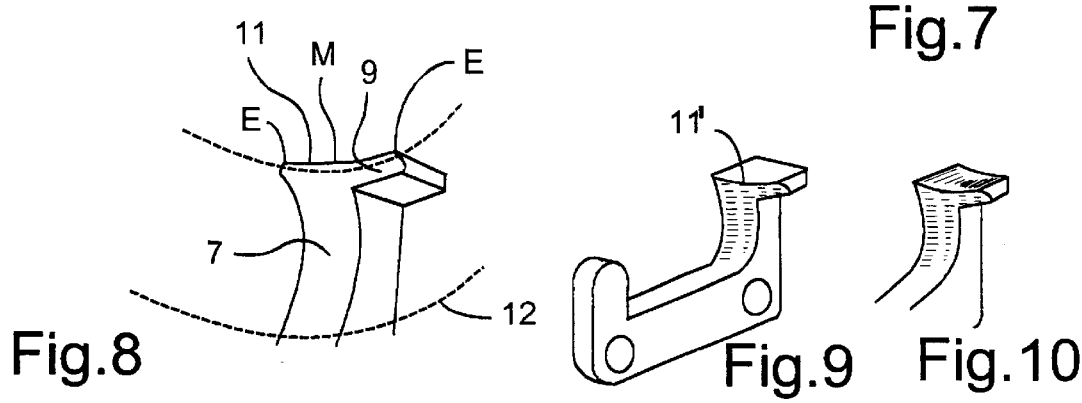
Fig.7
Fig.8  Fig.9  Fig.10

METHOD AND SYSTEM FOR SHARPENING TEETH ON SAW CHAINS

The present invention relates to a device for sharpening the teeth of motor chain saws. Users of motor saws are familiar with the necessity of sharpening the teeth on the chain at relatively frequent intervals to maintain satisfactory cutting, and are well aware that this procedure is difficult and time-consuming, or is a source of irritation. By its nature, the problem is particularly familiar to forestry workers.

According to normal standard, the chain saw teeth are filed purely manually by filing with a round file at a filing angle of approximately 30°.

Many devices have been developed to facilitate the sharpening operation, including control of the file alignment. In general, however, these known devices for controlling the forward and backward movement of the file, or even developing a rotary movement of the file, have not achieved widespread practical use.

Also, the use of motor grinding discs has been proposed, with an associtated fixture for holding the respective teeth of the chain. Apart from being troublesome, this method is even dangerous for the teeth themselves, because with a fast running grinding disc this easily results in the teeth being excessively heated, whereby their quality can be drastically reduced.

Chain teeth are in several respects very different from ordinary saw teeth, primarily in having not only an outwardly projecting flank portion, but also an outermost, bent-out top portion, which is to be sharpened from below such that the leading edges of both the flank and the top portion are kept sharp. Therefore, the tooth should be affected by a filing or grinding pressure in a direction away from the root of the tooth, in addition to the force against the flank itself. This influence is liable to cause the treated tooth carrying chain link to tilt outwardly from its position rested against the sword edge, and while this can be 'felt' and accepted by a manual filing it will nevertheless incur problems in connection with automatic sharpening, inasfar as some backing of the treated tooth is required.

Moreover, the tooth carrying chain links also have, at the end opposite to and operatively in front of the respective teeth, an outwardly protruding "rider", which is somewhat less protruding than the tooth and has the purpose of delimiting the intrusion of the tooth into the material being sawn and remove the resulting chips. These riders, arranged rather closely in front of the teeth, will to some degree prevent a grinding disc from entering the teeth in a fully ideal manner, which would be by way of a large disc rotating in a plane parallel with the chain carrying link in front of the tooth; in practice, however, it could be sufficient to operate with an inclined position of the plane of rotation, such that the disc edge will enter into the tooth with the disc just passing over the top of the rider.

Finally, the teeth of the saw chains appear with a much longer mutual distance than ordinary saw teeth. Normally there is a number of neutral chain links interposed between the consecutive tooth links, and since the consecutive teeth are layed out (or rather in) to opposite sides, the distance between two similarly oriented teeth will be correspondingly large. Although the chains are made with very high precision, unavoidable tolerances will cause small deviations of the distances referred to. The relevance of this observation will appear from the following.

Now, in connection with the present invention, it has been recognized that a more ideal shape of a rotary grinding or filing tool will be a file rod as first referred to, held against the tooth in exactly the same position as by conventional tooth filing, now only rounded up so as to form a relatively large circular element rising upwardly from the tooth and turned into an angular position relative to the saw sword corresponding to the desired filing angle, i.e. an angle of the magnitude 30° from the direction perpendicularly to the sword. In this manner the filing ring element, in-the local area immediately in front of the tooth, will appear practically exactly as a conventional file rod, except for a slight curvature thereof, i.e. the ring element will in no way interfere with the said rider in front of the tooth.

According to an important aspect of the invention it will then also be possible to arrange for means to excert a holding pressure against the top of the rider belonging to the tooth being filed, whereby the tooth or the entire tooth link can be stabilized against the said tilting in response to the filing/grinding pressure being applied to the tooth, thus without any need of arranging for a support of the tooth at the opposite side thereof. According to the invention, such means for holding down the riders may be provided even on the ring element itself, viz. as a laterally projecting flange which, during the rotation of the ring element, will steadily and slidingly engage the top of the relevant rider and thus stabilize the tooth.

Already by these measures the invention, in practice, provides for a sharpening system that will be superior to previous proposals. However, the invention comprises a further and extremely important development, viz. based on the finding that the said circular filing/grinding element, without any significant change in the character of the local engagement with the single tooth, can be changed from a circular shape into three-dimensional screw shape, in which it is able to cooperate, simultaneously, with a number of consecutive teeth. As mentioned, the distance between the chain saw teeth is relatively long and the filing angle is relatively large, and it has been found that these two conditions enable the design of a "screw file" having at each place a pitch angle corresponding to the desired filing angle and having a phase length equal to the distance between the teeth, without the diameter of this screw being extremely large or small compared with the chain or sword dimensions, this almost amounting to a "lucky coincidence". The screw file, in being rotated about an axis parallel with the moving direction of the teeth, will thus both sharpen the teeth and urge the teeth forwardly, that is rearwardly relative to their operational movement, in order to sharpen the teeth.

The required counter pressure on the teeth for the filing/grinding tool to-effect the desired result may be established already by the inherent resistance against the saw chain being moved along the sword.

Hereby an entirely novel perspective is encountered, viz. that the teeth of the saw chain can be sharpened by a continous movement, merely by a rotation of the filing/grinding screw element, when the latter is mounted in holding connection with the sword of the chain saw, with its axis of rotation held in parallel with the line of movement of the chain. The screw element may be driven at moderate speed, pressing itself against the front side of the teeth and thus forcing the chain rearwardly.

It is a further advantage that the direction of the filing/grinding movement is the preferred one, viz. with and not against the resulting sharp edges.

The sharpening screw element, just like the said circular filing or grinding element, may well be provided with the discussed flange member serving to hold down the riders, i.e. the tooth or teeth may be pushed rearwardly without any noticeable tilting, whereby a high quality sharpening is achievable by the fully automatic and continuous operation.

A novelty search based on the invention has revealed that it has earlier been proposed to sharpen ordinary saw teeth by means of rotating, screw shaped filing elements, see U.S. Pat. No. 570,732, published in 1896. However, the teaching of this document is impertinent to the sharpening of chain saw teeth, already because of the above-mentioned fundamental differences between ordinary saws and chain saws. By way of example, in connection with ordinary saw teeth it would not be possible to operate with a filing angle as large as 30° with this technique, because between the teeth there would not be space enough for the required tool. Besides, the said document does not indicate the possibility of modifying the screw member into a pronounced high pitch member usable for chain saws.

Moreover, the said U.S. Pat. No. 570,732 does not take into account the discussed condition with respect to slight variations of the distance between the chain saw teeth. The disclosed apparatus is provided with two counter rotating screw files for engaging, at the same time, two saw teeth as laid out to opposite sides in the usual manner, whereby the two screw members will assist each other in pushing the saw blade (band-saw) in its reverse direction, filing or grinding the two teeth simultaneously. For achieving this result the distance between the two teeth or any pair of two such teeth has to be exactly the same as the operative distance between the two filing or grinding screws, as in case of a slightly larger distance one tooth will be heavily worked while the pressure on the other tooth is relieved and this tooth not worked effectively, while in case of a slightly shorter distance at least one of the teeth and/or one of the filing screws may be mechanically damaged.

On this background and in accordance with the present invention, the discussed system should be laid out so as to work only one tooth at a time and as to ensure that the screw element is ready behind the next (or rather second next) tooth when it gets out of engagement with the just worked tooth. Thereafter and preferably only after the working of all of the teeth laid out to the same side, the screw tool for working the remaining teeth is made operative and the first screw tool is made inoperative. In practice, the tools are simply interchanged.

Thus, in connection with the invention the problem is not the distance variations between the teeth of opposite layout, but those between the consecutive teeth of the same type.

In the following the invention will be described in more detail with reference to the drawing, in which:

FIG. 4 is a perspective view at a preferred tool set according to the invention;

FIG. 5 is a lateral view of a chain saw sword with the tool set of FIG. 4 mounted thereon;

FIG. 6 is a top view illustrating the more detailed layout of the active part of the tool set;

FIG. 7 is a side view of a filing system for operational and concurrent filing of saw teeth laid out to opposite sides;

FIG. 8 is a perspective view of a conventional chain tooth; and

FIGS. 9–10 are similar views of teeth shaped according to the invention.

Figure 1:
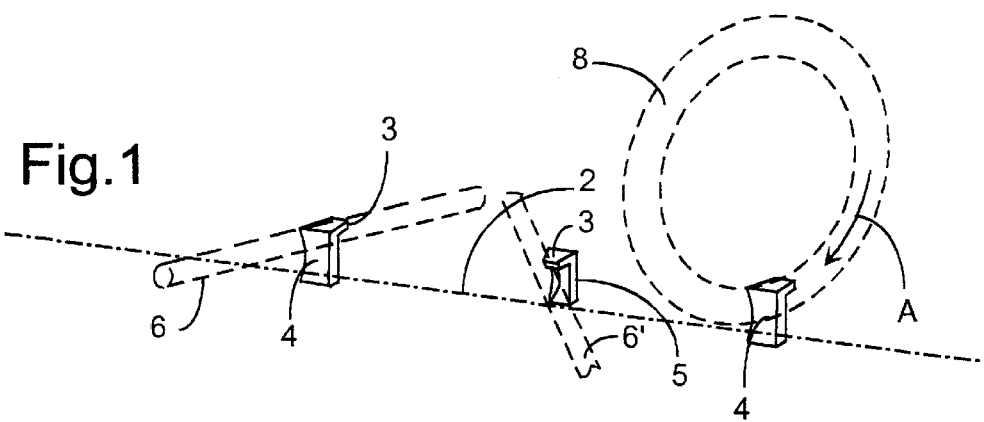
FIG. 1 is a perspective view of a row of chain saw teeth and different tools for filing or grinding the teeth.

In FIG. 1 is schematically indicated a saw chain 2, appearing with an upstanding saw tooth 4 to be sharpened by filing. Conventionally, this would be effected by working the tooth with a straight round file 6 held at a specific angle relative to the transverse direction of the chain e.g. at an angle of some 30° therewith, by reciprocation of the file 6, though preferably with filing pressure only in strokes with and not against the cutting edge. Each tooth has a bent-out top portion 3, the leading end of which is also sharpened by the filing. Every second tooth, designated 5, is laid out to the opposite side and should be filed by a file 6' under the same filing angle, but with mirrored orientation relative to the file 6, as shown.

According to the invention it has been found that it is perfectly possible to imitate the conventional filing by means of a file rod 8 rounded up into a circular shape and moved by a rotary motion, passing the tooth tangentially, whereby its engagement with the tooth will be practically identical with the effect of the straight file rod 6, though now with the improvement that the ring can be moved unidirectionally in the correct filing direction as indicated by an arrow A.

This is a basic concept of the invention, enabling a convenient, motor driven operation of the ring member 8.

Figure 2:
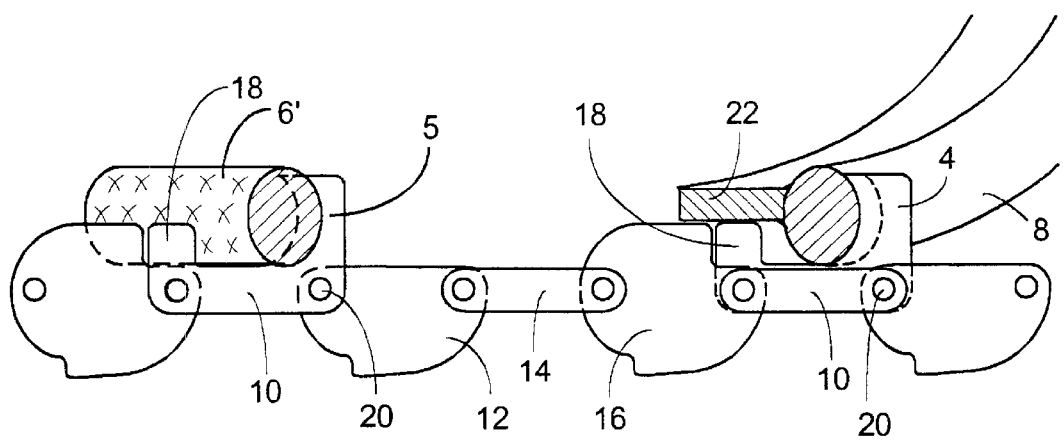
FIG. 2 is a lateral view of a saw chain and different sharpening tools.

The saw chain 2 is shown in more detail in FIG. 2. The teeth 4 and 5 are arranged on link members 10, which are interconnected by three other link members 12, 14 and 16, and in front of the cutting teeth (i.e. to the left) the links 10 are shaped with an upstanding "rider" 18 determining the intrusion depth of the tooth 4, 5 into the material being sawed. The file rods 6 or 8 will not in any way interfere with these riders, but in forcing such rods against the teeth 4.5, this will result in a tilting impact on the entire link 10 about its pivot pin 20 underneath the tooth portion 4.5, whereby the tooth may tilt and thus change the ideal filing conditions.

However, as shown to the right in FIG. 2 and in accordance with the present invention, it is possible to combine or provide the filing ring rod 8 with a projecting flange member 22 which, in operation, will serve to prevent any substantial raising of the rider 18, thus also preventing any substantial tilting of the link 10 and therewith the associated tooth 4 or 5.

Figure 3:
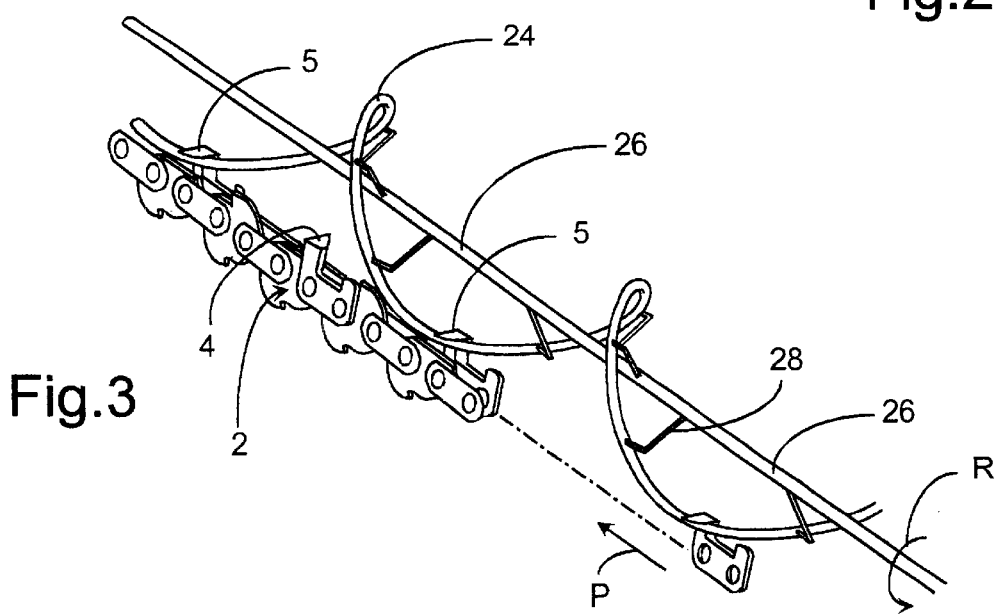
FIG. 3 is a perspective view of a saw chain and a tool according to the invention.

According to a further development of the invention it was found that the rather distance between two consecutive teeth 4 or 5 laid out to the same side could be able to condition that the file ring member 8 could be converted into a screw member 24 which—as shown in FIG. 3—could extend along the saw chain, with a pitch satisfying the requirements as to the filing angle and also with a winding length corresponding to the distance between two consecutive teeth 4 or 5, without the diameter of this screw member being excessively "small" or "large". The saw chains were never designed with a view to this criterion, and it is to be regarded as a lucky coincidence that the chain teeth will be sharpenable/filable/grindable based on the findings of the present invention.

In FIG. 3 it is shown that the ring member 8 of FIGS. 1 and 2, originally arranged in an oblique plane of rotation corresponding to the desired filing angle, is now converted into a screw rod structure 24 axis-parallel with the saw chain 2 and having a pitch corresponding to the desired filing angle of the teeth as well as a winding length corresponding to the distance between two consecutive, similarly oriented teeth 4 or 5, without the required diameter of the screw rod 24 hereby being excessivlely small or large. The screw rod member 24 is shown connected to a central rotary a shaft 26 by means of radial pins 28. When the shaft is rotated in the direction R, the screw 24 is rotated so as to effect a movement of the chain 2 in the marked direction P, and at the same time the teeth 4 are filed as desired.

FIG. 3 merely illustrates the very principle of filing the teeth by means of a screw rod. In practice, of course, a more rigid structure will be required, and besides, as mentioned above, the screw should not be laid out to work more that a single tooth at a time.

A practical embodiment of a sharpening apparatus according to the invention is shown in FIGS. 4 and 5. The apparatus comprises a fixture member 30 having opposed plate portions 32 which, by means of clamp screws 34, can be secured to the sword 36 of a chain saw, with an intermediate bushing portion 38 rising above the top edge thereof. The portion 38 has a throughhole 40 for receiving a driving shaft 42 of a cylindrical body 44 provided with a screw formation 46 comprising a plate strip 48 and a further raised, undercut rod member 50.

In its mounted position as shown in FIG. 5, the cylinder 44 is rotatable e.g. by the chuck 52 of a drilling or screwing machine. It will be readily understood that by such a rotation the filing or grinding rod member 50 will be operable to sharpen the teeth 4 successively pushing the chain rearwardly out of its working direction.

Chain saw teeth, unlike ordinary saw teeth, are characteristic in being slightly movable relatively to each other and to the their common carrier structure, inasfar as they are displaceable in all three main directions. For a high quality sharpening, therefore, it is required to stabilize the teeth—or the tooth being worked, and of course also to mount the fixture member 30 very accurately on the sword 36. In the following, the-conditions in each of the main directions will be discussed separately:

1. Vertical Direction

The fixture member 30 (FIG. 5) should be mounted such that the lower side of the cylinder is located parallel with and slightly above the path of travel of the top of the teeth 4.5 in order to allow the rod member 50 to properly sharpen the top portions 3. In a preferred arrangement, the cylinder 44 can be replaced by a calibration body or cylinder 54 having a bottom surface which, in the mounted position, is located slightly closer to the teeth than the bottom side of the cylinder 44, and this calibration body, therefore, can be used for adjusting the fixture body to a correct position, simply by placing the calibration body on the top of the teeth and tightening the clamp screws 34. When thereafter the calibration body is removed and replaced by the cylinder 44, the bottom of the latter will be correctly positioned. Now the screw 46 can be rotated or the chain 2 moved to establish filing contact with a file 4, and from then on the top of the relevant riders 18 will be held down by the screwed plate strip 48, at also discussed in connection with items 18 and 22 of FIG. 2. The leading end of the tooth link 10 will be stabilized vertically by the filing engagement itself.

2. Lateral Direction.

The tooth links are able to move and tilt somewhat in the cross direction, and for a correct sharpening they should be stabilized in that direction. To this end, the fixture member 30 comprises a pair of sliding rail members 56, FIG. 4, preferably made of plastics, which are insertable along the upper part of the inner sides of the plate portions 32 so as to more or less closely fill out the gaps between these sides and the row of outer rivet heads 58 of the chain links. Thereby the teeth can be sufficiently stabilized, and at the same time the rivet heads will be protected against wear by their sliding along the low friction members 56.

3. Length Direction.

As shown in FIG. 6, the screw member 50 should preferably be a little longer that the nominal distance between the relevant teeth, such that the next tooth can be safely gripped even if the tooth distance, due to tolerances, is somewhat longer than the nominal distance. Ideally, therefore in order to allow for both positive and negative tolerances, the leading end E1 of the screw 50 should be able to enter the new tooth link midway between the tooth and the rider thereof, when the worked tooth is just about to be left by the trailing screw end $E_2$. This corresponds to the screw having an operative length L as shown in FIG. 5. The outer end portion $E_2$ of the screw 50 is made with a pitch somewhat smaller than the general screw pitch, whereby the driven chain will slow down a little at the end of the engagement, sufficiently to enable the leading end portion $E_1$ to catch up with the next tooth $(V_i > V_u)$ before the first tooth is released from $E_2$. The end portion $E_1$ may have the same or even a greater pitch than the general screw pitch, whereby it is achievable that the next tooth is engaged so as to take over the driving of the chain at a speed higher that $V_u$ thus causing the first tooth to be moved forwardly out of engagement with $E_2$, i.e. with a "soft" release of this tooth even if the tooth distance deviates from the nominal distance. In this manner the apparatus will be self-adjusting with respect to the said variations in the longitudinal direction.

When all the teeth of a first type have seen sharpened, e.g. after 5–10 revolutions of the saw chain, the cylinder 44 is removed, and a corresponding, mirrored cylinder is mounted for treating all the teeth of the second type, now driven in the opposite direction of the cylinder 44. A complete resharpening procedure, typically, will be accomplished in-some 2–4 minutes.

It should be mentioned that the longitudinal dimension of the chain teeth will-be reduced as the teeth are sharpened over and over, whereby the free distance between a tooth and its preceding rider (18, FIG. 2) will increase. Therefore, in order to ensure a correct function of the holding plate portion (22, FIG. 2 and 48, FIG. 4) this portion should be broad enough to effectively cover the rider of both a new and an advanced 'filed back' tooth.

In operation there will be a certain wear on the top of the teeth, so they will be gradually slightly lower, also because their top side is normally slanting rearwardly and downwardly such that they get lower as a result of the filing back operations. This will imply a reduction of the thickness of the chips, and it is well known that in order to avoid this effect it can be desirable to file down the riders slightly from time to time. In connection with the invention, however, it will be appreciated that it is possible to arrange the plate formations 22, 48 so as to be moderately filing or grinding, whereby they will be able to gradually reduce the height of the riders.

The filing or grinding rod 8,50 may be adapted to have a higher or lower efficiency, all according to a desired performance with respect to working pressure and speed, heat development etc.

The cross section of the filing or grinding rod should not necessarily be "round", if only the side portion cooperating with the teeth has the relevant profilation. The riders may be held down directly by the surface of the cylinder 44, in which case it will be relevant to arrange for a screw shaped groove in the cylinder for taking up further projecting tooth portions.

In FIG. 7 it is indicated that a very short filing screw portion 60 is arranged for a brief filing of passing teeth 4, while another, complementary filing screw member 62 is arranged for concurrently filing the teeth 5. As shown the screw segment 60 can be driven with one direction of rotation by means of a motor shaft 64 of a motor 66, while the screw segment 62 can be driven by an oppositely rotating coaxial shaft 68 from the same motor 34.

It is a special aspect of the invention that the short screw section 60 and 62 may be provided as integrated parts of a chain saw, i.e. housed inside the outer casing thereof and not being parts of an exterior filing apparatus for intermittent use. In this way the teeth can be sufficiently and currently filed during their normal operation, or at least without the mounting of external equipment.

In the latter case the rotation of the shafts 64, 68 should be synchronized with the motor driven chain such that only a slight working pressure will act on the teeth. The direction of movement of the rods is not the most attractive, because it will be against and not with the cutting edges, but if the screw segments are operating continuously during the sawing they will not need to be particularly effective, and this may make the arrangement acceptable anyway.

It should be noted that the screw file may be arranged at the inside of a surrounding cylinder arranged to be rotated from its outside. The chain may then be worked in being moved through the screw file.

In the present connection it will apply similarly that an ideal original shape of the teeth will be as though they have already been filed by means of an arched file according to the principles of the invention. This will be of practically no significance for the relatively narrow filing surface of the vertical flank 7 of the teeth, see FIG. 8, while for the horizontal top face 9 with its straight cutting edge 11 a filing operation with an arched file 12 will start working the opposed end areas marked E, while the middle area M will remain unaffected by the first filing operations. Therefore, in order to make the teeth fully sharpenable right from the beginning, the geometry of the top portions should preferably be suitably adapted, either as shown in FIG. 9, where the cutting edge 11' is slightly forwardly convex, or as shown in FIG. 10, where the top side is slightly grooved in the longitudinal direction; the latter possibility may be advantageous even for the saw effect of the sharp corner of the cutting edge. The invention will comprise such chains which are designed particularly for cooperation with the filing system of the invention.

What is claimed is:

1. A method of sharpening the teeth of a saw chain comprising the steps of:
    moving a file or grinding rod, which is rounded in a lengthwise direction, axially across the individual teeth at a desired sharpening-angle with the saw chain remaining mounted on an associated saw sword and sharpening a leading edge of both a tooth flank projecting from the saw chain and a bent-out top portion of the tooth by positioning and displacing the rod in said lengthwise direction so as to create a laterally oriented sharpening pressure against the tooth.

2. An apparatus for sharpening the teeth of a saw chain comprising:
    a lengthwise rounded filing or grinding rod which is movable axially across the individual teeth at a desired sharpeng angle with the saw chain remaining mounted on an associated saw sword,
    wherein the rod sharpens a leading edge of both a tooth flank projecting from the saw chain and a bent-out top portion of the tooth,
    wherein the rod is unidirectionally positionable and rotatable so as to create a laterally oriented sharpening pressure against the tooth and a bent-out top portion thereof.

3. The apparatus according to claim 2, in which the lengthwise rounded rod is a closed ring member, which is operable to engage a chain tooth with the desired sharpening angle in that a plane of rotation of the ring member is turned out of a cross plane of the tooth.

4. The apparatus according to claim 2, in which the lengthwise rounded rod is spirally coiled, having an axis of rotation extending in parallel with a moving path of the teeth along a selected fraction of a chain passage along the saw sword.

5. The apparatus according to claim 4, comprising means for effectively clamping of the saw tooth carrying chain links against local movements during the sharpening of the tooth.

6. The apparatus according to claim 5, in which said clamping means comprises plate portions associated with the rounded rod positioned thereon such that during the operative engagement between a chain tooth and the moving rod, the plate portion will slidingly engage the top of a rider located on the same chain link as the tooth.

7. The apparatus according to claim 6, in which the plate portion is of a moderately grinding nature.

8. The apparatus according to claim 4, in which a length of the screw member is slightly longer than a nominal distance between consecutive teeth to be sharpened, and in which a pitch of the screw member is smaller at an end of tooth delivery than at a leading end of the screw member.

9. The apparatus according to claim 4, in which the screw member is arranged on a cylinder, which is rotatably mountable in a fixture member to be fastened to the saw sword, the cylinder being exchangeable with another, mirrored cylinder for sharpening, with opposite direction of rotation, those teeth which are laid out to the opposite side.

10. The apparatus according to claim 4, wherein the apparatus is integrated in a housing of a chain saw.

11. The apparatus according to calim 3, comprising means for effectively clamping of the saw tooth carrying chain links against local movements during the sharpening of the tooth.

\* \* \* \* \*